United States Patent

Fukushima et al.

[11] Patent Number: 5,646,355
[45] Date of Patent: Jul. 8, 1997

[54] TORQUE RESPONSIVE ROTATION CONTROL DEVICE

[75] Inventors: Shigeaki Fukushima, Hamamatsu; Tatsuo Kawase, Iwata, both of Japan

[73] Assignee: NTN Corporation, Osaka, Japan

[21] Appl. No.: 663,910

[22] Filed: Jun. 14, 1996

[30] Foreign Application Priority Data

Jun. 14, 1995 [JP] Japan ................. 7-172925

[51] Int. Cl.$^6$ ................................................ G01L 3/02
[52] U.S. Cl. ........................... 73/862.195; 73/862.321
[58] Field of Search ............... 73/862.195, 862.191, 73/862.08, 862.21, 862.22, 862.23, 862.321; 81/467

[56] References Cited

U.S. PATENT DOCUMENTS

| | | | |
|---|---|---|---|
| 3,162,041 | 12/1964 | Musser | 73/862.321 |
| 3,877,274 | 4/1975 | Wahlstedt | 73/862.321 |
| 4,193,720 | 3/1980 | Machida | 73/862.322 X |
| 4,364,277 | 12/1982 | Rundell | 73/862.326 |
| 4,457,183 | 7/1984 | Westbrook | 73/862.323 X |
| 4,569,234 | 2/1986 | F'Geppert | 73/862.195 |
| 4,584,884 | 4/1986 | Lesko | 73/862.195 |
| 4,765,191 | 8/1988 | Kume | 73/862.195 |
| 5,374,134 | 12/1994 | Gustafsson et al. | 73/862.321 X |

*Primary Examiner*—Elizabeth L. Dougherty
*Attorney, Agent, or Firm*—Birch, Stewart, Kolasch & Birch, LLP

[57] ABSTRACT

A torque responsive rotation control device includes a torque limiting mechanism interposed between an input rotary member and an output shaft coaxial with the input rotary member. The torque limiting mechanism includes a torque cam engageable with the output shaft to rotate together therewith and movable axially relative to the output shaft and detachably engageable with the input rotary member in a direction of rotation thereof; and a plurality of springs for biasing the torque cam in a direction required for the torque cam to engage the input rotary member.

9 Claims, 10 Drawing Sheets

TORQUE RESPONSIVE ROTATION CONTROL DEVICE

BACKGROUND OF THE INVENTION

1. Field of the Invention

The present invention relates to a torque responsive rotation control device for use in association with an auxiliary equipment of an engine, or a machine or device driven by a prime mover such as, for example, a motor.

2. Description of the Prior Art

Figure 15:
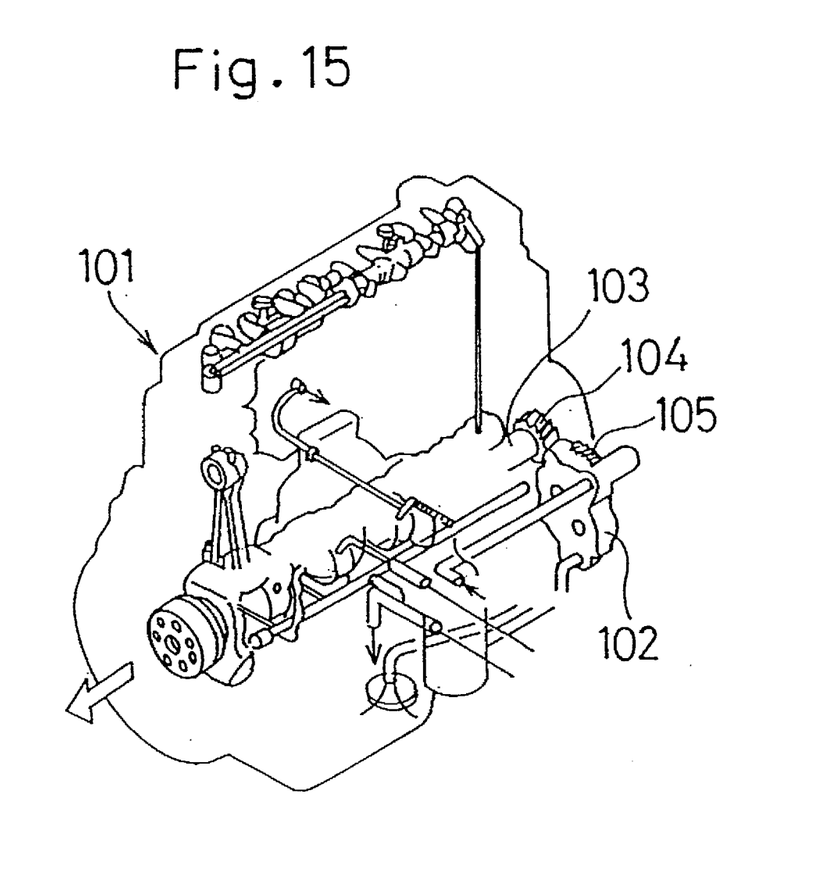
FIG. 15 is a schematic perspective diagram showing the connection between the conventional engine and the engine auxiliary equipment.

As is well known to those skilled in the art, an engine auxiliary equipment is directly driven by a crankshaft of an engine through a pulley or a gear train, an example of which is shown in FIG. 15.

As shown in FIG. 15, an oil pump 102 which is an auxiliary equipment of the engine 101 includes an oil pump gear 105 meshing with a crank gear 104 mounted on the crankshaft 103 for rotation together therewith. The oil pump 102 shown therein is in the form of a gear pump and is operable to circulate a lubricant oil for the engine 101 in a manner known to those skilled in the art.

As discussed above, the engine auxiliary equipment such as the oil pump 102 is driven directly by the crankshaft 103 of the engine 101 and, therefore, when the engine auxiliary equipment is designed to give a sufficient performance at a low rotational speed of the engine 101, the performance of the engine auxiliary equipment will become so excessive at a high rotational speed of the engine 101 as to result in a loss of the engine output. On the other hand, in terms of the design of the engine auxiliary equipment, the engine auxiliary equipment must be so designed as to ensure a lifetime at a high speed region of the engine at which the performance of the engine auxiliary equipment becomes too excessive and, therefore, not only is reduction in size of the equipment hampered, but also it constitutes a cause of reduction in fuel efficiency.

SUMMARY OF THE INVENTION

Accordingly, the present invention has for its primary object to provide a torque responsive rotation control device capable of maintaining the rotational speed of a driven device such as the engine auxiliary equipment at a proper level by reducing an input rotation, provided for by a prime mover such as an engine, with respect to a predetermined torque value and then transmitting it to an output shaft coupled with the driven device.

Another important object of the present invention is to provide the torque responsive rotation control device of a type referred to above, which is installed between the crankshaft of the engine and the engine auxiliary equipment to maintain the rotational speed of the engine auxiliary equipment at a high speed region of the engine at a necessary and sufficient performance level, so that not only can the engine auxiliary equipment be assembled compact in size, but the fuel efficiency can also be increased.

In order to accomplish these and other objects and features of the present invention, there is provided in accordance with the present invention a torque responsive rotation control device which comprises a torque limiting mechanism installed between an input rotary member and an output shaft coaxial with said input rotary member. The torque limiting mechanism includes a torque cam mounted for non-rotation and axial movement relative to the output shaft and detachably engageable with the input rotary member in a direction of rotation thereof, and a spring means for pressing the torque cam in a direction required for the torque cam engage the input rotary member.

With this construction, the rotation of the input rotary member can be reduced with respect to the predetermined torque value when it is transmitted to the output shaft. Accordingly, by setting as a target rotational speed the rotational speed corresponding to the uppermost limit of the torque value, rotation of the output shaft in a higher speed region than the uppermost limit can be controlled.

In a preferred embodiment of the present invention, the torque responsive rotation control device is provided with a one-way damper including an oil chamber for imposing an oil pressure on the torque cam in an axial direction so as to increase a force of engagement of the torque cam and a throttle settled in a discharge passage of the oil chamber.

The use of the one-way damper is advantageous in that while the input rotary member is allowed to rotate relative to the output shaft the rotational speed of the torque cam, that is, the rotational speed of the output shaft can be maintained at a proper level with good response exhibited in selective engagement and disengagement of the torque cam.

In another preferred embodiment of the present invention, the torque limiting mechanism also includes a plurality of balls arranged in a circumferential direction in which the torque cam and the input rotary member are engaged with each other and wherein said torque cam has a cam face serving as a raceway along which the balls roll, said cam face representing a circumferentially extending groove having a depth varying cyclically in the circumferential direction. This design makes the torque responsive rotation control device to exhibit a smooth torque limiting operation.

In a further preferred embodiment of the present invention, at least a portion of the cam face of the torque cam represents a sectional shape, as viewed in a radial direction thereof, which conforms to the shape of the balls, so that the surface area of contact between the balls and the cam face can be increased to avoid any possible damage to the cam face.

According to a still further preferred embodiment of the present invention, the cam face of the torque cam is formed by a plurality of radial engagement grooves arranged in the circumferential direction and guide grooves of a depth smaller than that of the engagement groove, each of said guide grooves extending circumferentially and communicating the neighboring engagement grooves together. With this design, by adjusting the difference in depth between the engagement grooves and the guide grooves, the value of torque to which the torque limiter can respond can easily be defined. Also, since the cam face can be formed so as to have a simplified shape, for example, the engagement groove can have a generally V-shape in its transverse section while extending radially and the guide groove can have a fixed depth, it can be easily formed.

In a yet further preferred embodiment of the present invention, the torque cam is mounted on the output shaft through an involute spline and the throttle has a discharge port opening towards a slide face of the involute spline. This is particularly advantageous in that, while the involute spline that can be manufactured compact in size even though it requires lubrication, the involute spline can satisfactorily be lubricated by the oil discharged through the throttle.

In the practice of the present invention, the torque responsive rotation control device may be used in association with the engine auxiliary equipment to drive the latter. In such case, the input rotary member may be coupled with a crankshaft of an engine while the output shaft is coupled with an engine auxiliary equipment such as, for example, an oil pump. When so used, the engine auxiliary equipment can not only maintain the rotational speed even at a high speed region of the engine at a necessary and sufficient level, but also it can be assembled compact in size while permitting it to exhibit an increased fuel efficiency.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENT

Figure 1:
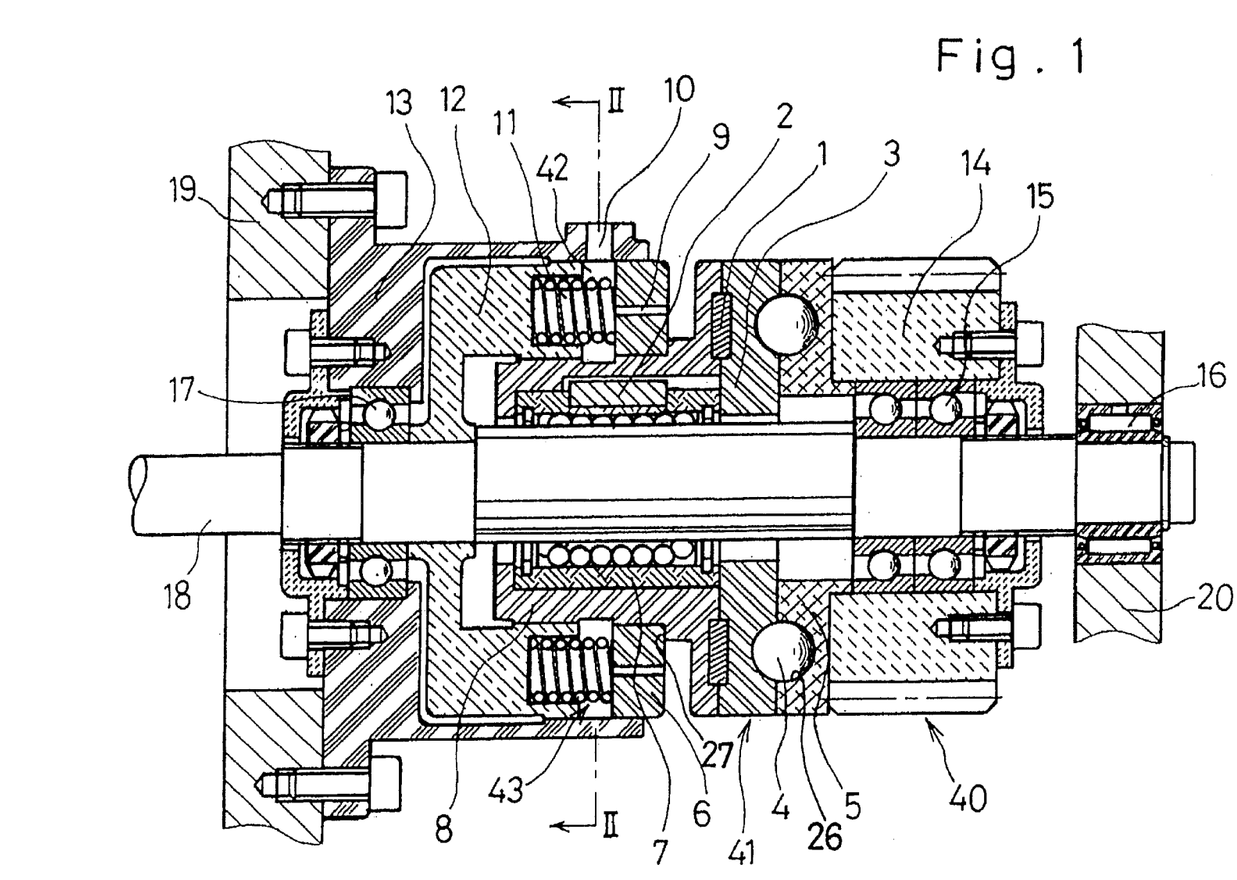
FIG. 1 is a longitudinal sectional view of a torque responsive rotation control device according to a first preferred embodiment of the present invention.
Figure 2:
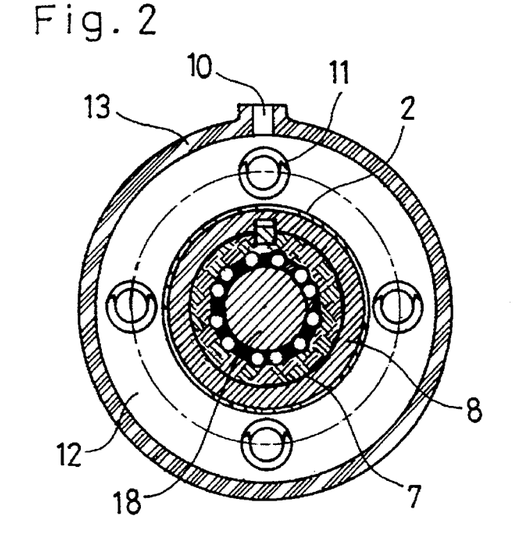
FIG. 2 is a cross-sectional view taken along the line II—II in FIG. 1.
Figure 12:
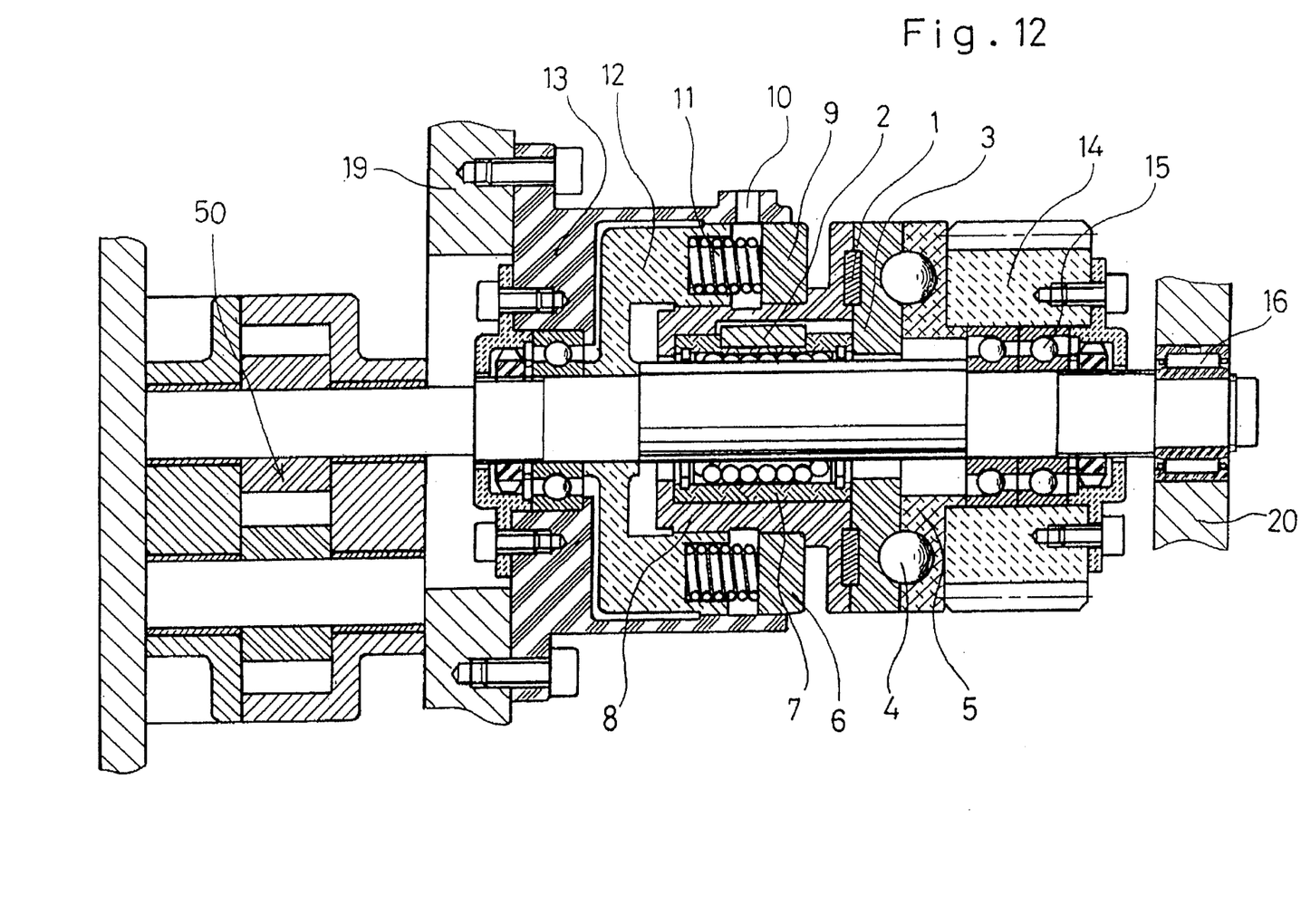
FIG. 12 is a longitudinal sectional view of the torque responsive rotation control device according to the first preferred embodiment of the present invention which is shown as coupled with an engine auxiliary equipment.
Figure 13:
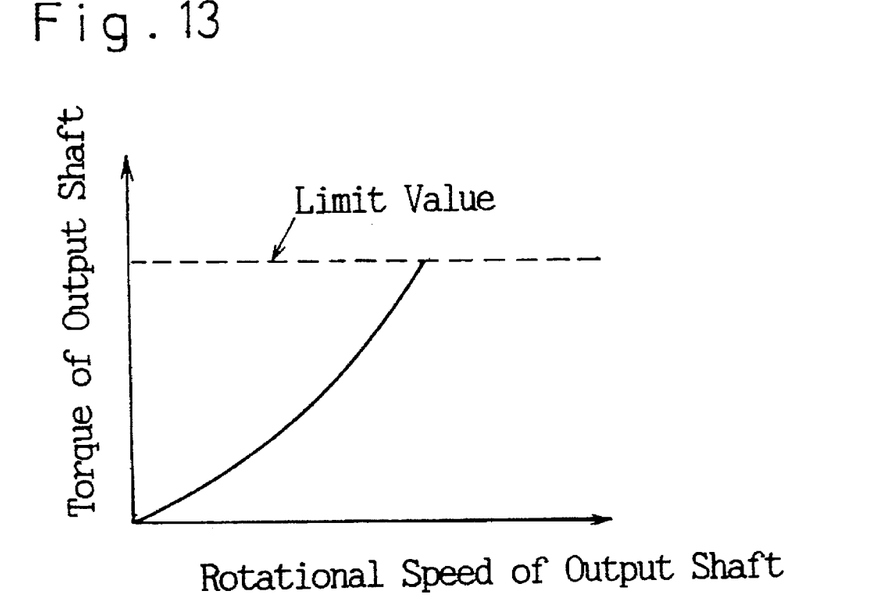
FIG. 13 is a characteristic curve showing the relationship between the number of revolutions of the output shaft and the torque.

A torque responsive rotation control device according to a first preferred embodiment of the present invention will now be described with particular reference to FIGS. 1 to 5. Of these figures, FIGS. 1 and 2 are longitudinal and transverse sectional representations, respectively, of the torque responsive rotation control device shown as drivingly coupled with an engine auxiliary equipment which is an example of driven devices. As shown in FIG. 1, an input gear 14 is supported by a beating 15 for rotation relative to an output shaft 18 which is in turn supported by bearings 16 and 17 for rotation relative to different portions 19 and 20 of an engine block. One of opposite ends of the output shaft 18 remote from the input gear 14 is adapted to be drivingly coupled with an input unit of the engine auxiliary device 50 shown in FIG. 12. The engine auxiliary device 50 shown in FIG. 12 is, for example, an oil pump in the form of a gear pump. As shown in FIG. 13, the engine auxiliary device 50, that is, the oil pump in the illustrated embodiment, is of a design wherein as shown in FIG. 13, the torque of the output shaft 18 has a linear relation with the rotational speed of the output shaft 18.

As shown in FIG. 1, the input gear 14 has a ring-shaped ball retainer 5 coupled thereto by means of pins or keys for rotation together therewith. The ball retainer 5 has a plurality of, for example, four, semi-circular pockets 26 defined therein for receiving therein respective balls 4 of a diameter slightly smaller than twice the radius of curvature of the semi-circular shape of each pocket 26. This input gear 14 and the ball retainer 5 altogether constitute an input rotary member 40.

Figure 3A:
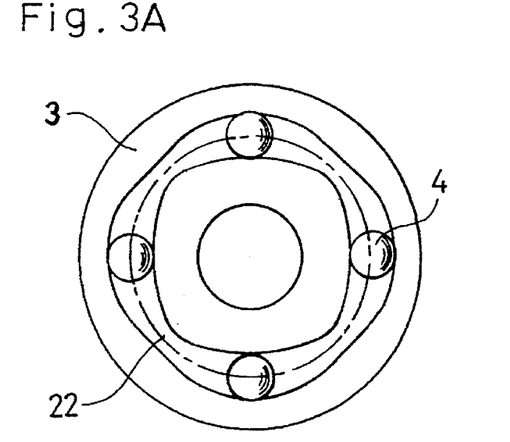
FIG. 3A is a front view of a torque cam in a stationary condition.
Figure 3B:
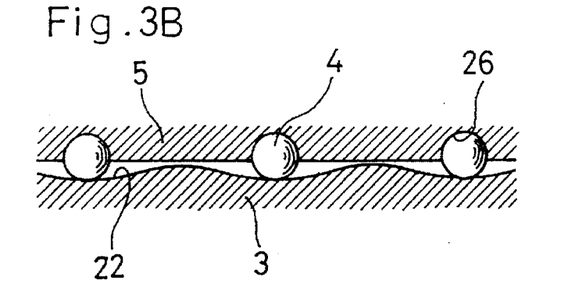
FIG. 3B is a sectional view of the torque cam in the stationary condition, taken along the pitch circle of balls employed therein.
Figure 4A:
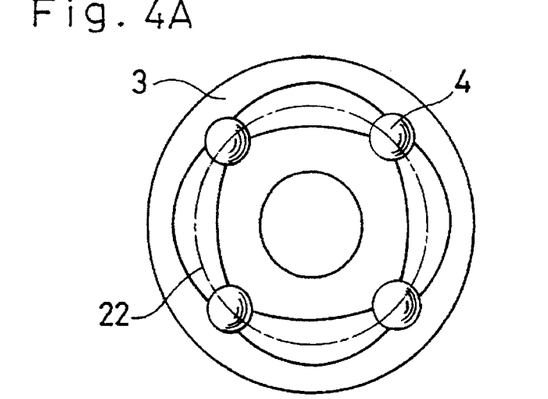
FIG. 4A is a front elevational view of the torque cam in a condition riding over a cam face.
Figure 4B:
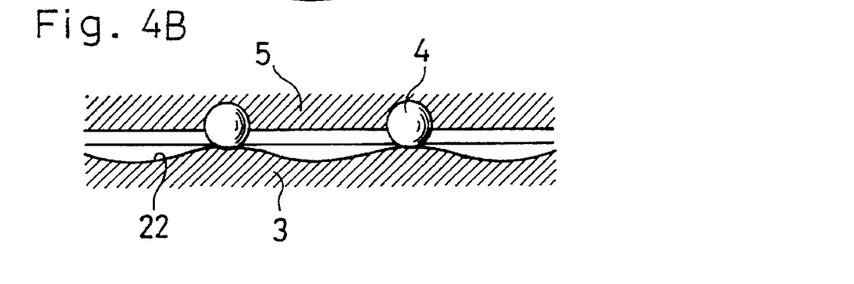
FIG. 4B is a sectional view of the torque cam in the condition riding over the cam face, taken along the pitch circle of the balls employed therein.
Figure 5A:
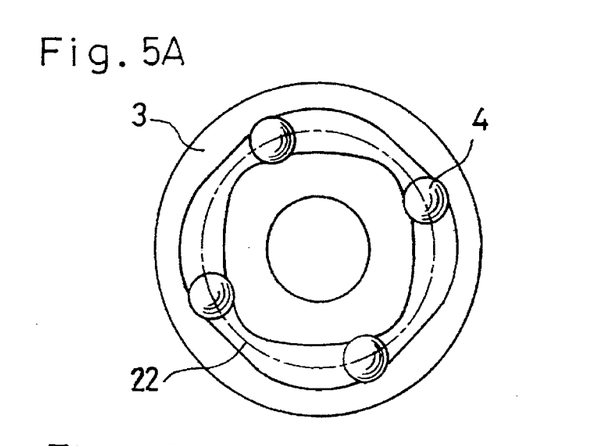
FIG. 5A is a front elevational view of the torque cam during torque transmission.
Figure 5B:
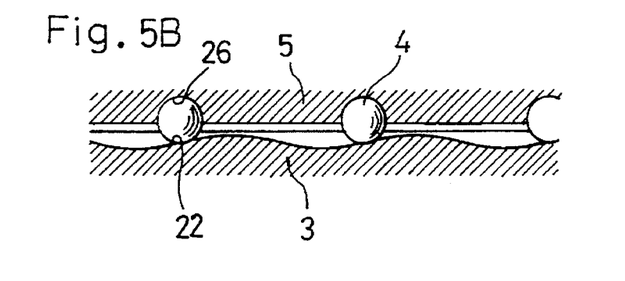
FIG. 5B is a sectional view of the torque cam during the torque transmission, taken along the pitch circle of the balls employed therein.

A generally ting-shaped torque cam 3 having a cam face 22 is disposed around the output shaft 18 at a location next to the input rotary member 40, that is, on one side of the ball retainer 5 opposite to the input gear 14, with the balls 4 in the ball retainer 5 held in contact with the cam face 22 by the action of biasing or pressing forces of respective springs 11. The cam face 22 of the torque cam 3 serves as a raceway for the balls 4 and is, as shown in FIGS. 3 to 5, in the form of a circumferentially extending cam groove. The sectional shape of such cam groove along the pitch circle in which the balls 4 are disposed varies substantially sinusoidally so as to render such groove to have a depth varying circumferentially. Also, the sectional shape of such cam groove along the radial direction thereof represents a semi-circular shape having a radius of curvature substantially equal to the radius of each ball 4 to render it to conform to the shape of the respective ball 4. By this design, the contact pressure between the balls 4 and the cam face 22 is advantageously reduced to prevent the cam face 22 from being damaged.

The torque cam 3 referred to above is mounted on the output shaft 18 through a ball spline 7 that does not permit the torque cam 3 to rotate relative to the output shaft 18, but permits the torque cam 3 to move axially relative to the output shaft 18. This torque cam 3 and a tubular spline housing 8 accommodating therein the ball spline 7 are coupled together by means of keys 1 so that the torque cam 3 does not rotate relative to the tubular spline housing 8 and, in turn the spline housing 8 and the ball spline 7 are, as shown in FIG. 2, coupled together by means of keys 2 so that the spline housing 8 does not rotate relative to the ball spline 7. The torque cam 3, the balls 4, the spline housing 8 and the ball spline 7 altogether constitute a torque limiter 41 that smoothly moves axially to transmit a torque to the output shaft 18 shown in FIG. 1.

A spring housing 12 fixedly mounted on the output shaft 18 is provided with a plurality, of, for example, four, springs 11 that are spaced an equal distance from each other in a circumferential direction. Reactive forces of those springs 11 act on the torque cam 3 through a spring stopper 6, engaged with the spline housing 8, and then through the spline housing 8. The spline housing 8 is of a generally tubular shape, whereas the spring stopper 6 in the form of a ring plate is mounted on the spline housing 8 and engaged against an annular step delimited at 27 between large and small diameter portions of the spline housing 8. The spring housing 12 is of a generally cylindrical shape having a hub defined at one end thereof and is mounted on the spline housing 8 for axial movement relative thereto and is also mounted on the output shaft 18 through the hub integral with the spring housing 12.

A housing 13 fixed to the engine block portion 19 is mounted over the spring homing 12 and the spring stopper 6 for rotation and axial movement relative thereto and cooperates with the spring housing 12, the spline housing 8 and the spring stopper 6 to leave an annular space which defines an oil chamber 42. This oil chamber 42 is communicated with an oil supply port 10 defined in the housing 13 for receiving a predetermined quantity of oil supplied from an oil pump by way of a check valve (not shown). Oil supplied into the oil chamber 42 is capable of being discharged through an orifice 9 defined in the spring stopper 6 and serves as a discharge passage, and the oil chamber 42 and the orifice 9 altogether form a one-way damper 43.

The operation of the torque responsive rotation control device of the above described construction will now be described. Assuming that the rotational speed of the engine is small and the torque outputted from the crankshaft of the engine is transmitted to the input gear 14, the torque is then transmitted to the balls 4 through the ball retainer 5. At this time, the balls 4 tends to apply an axially displacing force to the torque cam 3, supported by the output shaft 18 through the ball spline 7, to move the torque cam 3 axially towards the spring housing 12 in an attempt to ride over the cam face 22 in the torque cam 3. However, since torque of the pump 50 is small, the balls 4 are overcome by the reactive forces of the springs 11 and are therefore held still midway to the cam face 22. Consequently, 100% of the input torque is transmitted to the output shaft 18 through the torque cam 3, the spline housing 8 and the ball spline 7 to thereby drive the engine auxiliary equipment. This condition is shown in FIGS. 5A and 5B.

On the other hand, when the rotational speed of the engine increases to a value sufficient to permit the torque to overcome the reactive forces of the springs 11, the balls 4 ride over crests of the cam face 22 in the torque cam 3 as shown in FIGS. 4A and 4B, to permit a relative rotation to take place between the input gear 14 and the output shaft 18 with the transmission of the torque to the output shaft 18 consequently interrupted temporarily. However, by the action of the spring 11, the torque cam 3 is again brought into contact with the balls 4 to transmit the torque, resulting in intermittent transmission of the torque from the torque cam 3 to the output shaft 18. Consequently, the input torque having been limited to such an extent as to allow a relative rotation to take place between the input and output shafts is transmitted to the output shaft 18 through the torque cam 3, the spline housing 8, and the ball spline 7 to thereby drive the engine auxiliary equipment.

Figure 14:
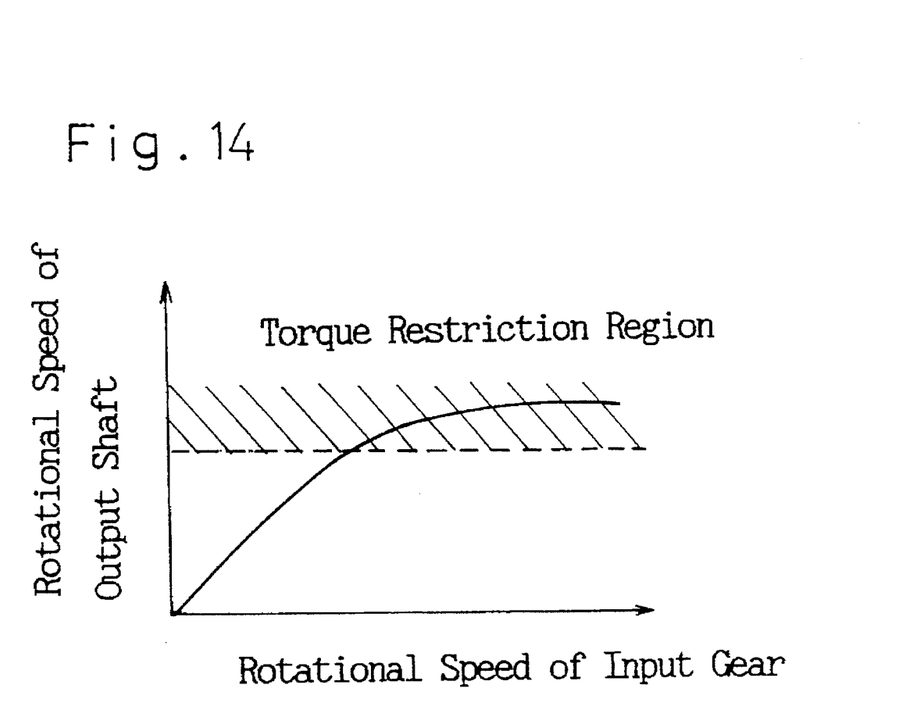
FIG. 14 is a characteristic curve showing the relationship in number of revolutions between the input gear and the output shaft.

In this way, as shown in FIG. 13, the torque of the output shaft 18 is restricted to a value lower than a limit value. Accordingly, as shown in FIG. 14, even though the rotational speed of the input gear 14, that is, the rotational speed of the engine increases, the rotational speed of the output shaft 18 is restricted to a value within a torque limit region. Although at a high rotation, that is, a high frequency, the intermittent torque transmission may result in a chattering phenomenon thereby failing to accomplish the torque transmission, the provision of the one-way damper 43 in a direction in which the torque cam 3 separates away from the balls 4 provides a damping action to thereby avoid any possible occurrence of the chattering phenomenon, permitting the torque transmission to take place intermittently.

According to the foregoing preferred embodiment of the present invention, the torque to be transmitted to the output shaft 18 or the rotational speed of the output shaft 18 can be limited depending on the magnitude of the torque of the engine and, for this reason, unlike the conventional case in which the engine auxiliary equipment is coupled direct with the engine, the rotational speed of the engine auxiliary equipment can advantageously be restricted at a high rotational region of the engine. Accordingly, not only can a power loss be avoided, but also the engine auxiliary equipment can be manufactured compact in size.

Figure 6A:
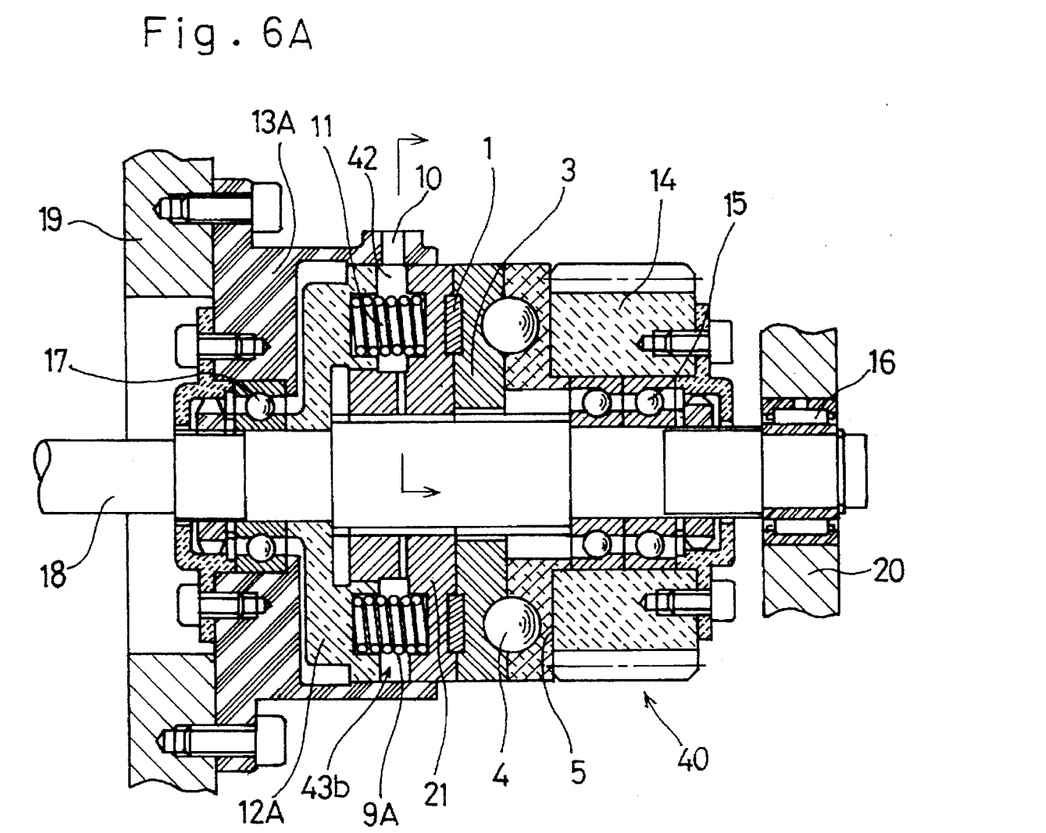
FIG. 6A is a longitudinal sectional view of the torque responsive rotation control device according to a second preferred embodiment of the present invention.
Figure 6B:
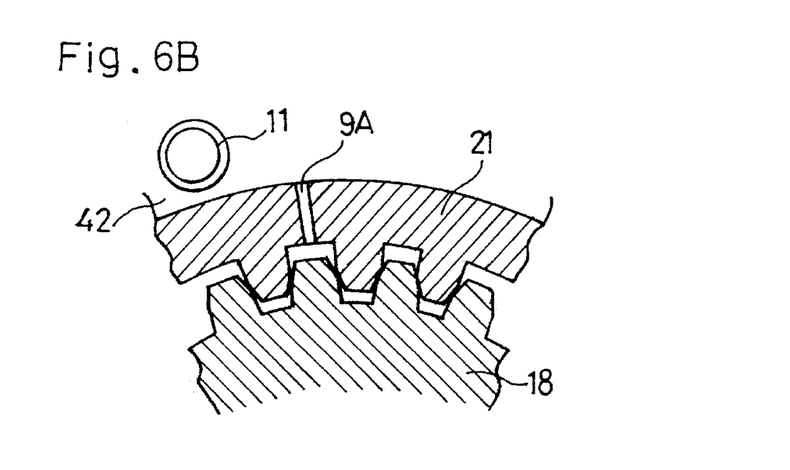
FIG. 6B is a fragmentary transverse sectional view showing an oil discharge passage leading from an oil chamber in the torque responsive rotation control device shown in FIG. 6A.

The torque responsive rotation control device according to a second preferred embodiment of the present invention is shown in FIGS. 6A and 6B. In this second embodiment of the present invention, as a transmission element between the torque cam 3 and the output shaft 18, an involute spline is employed and disposed in a spline hub 21 which is coupled with the torque cam 3 by the keys 1 for non-rotation movement relative to each other. The use of the involute spline is particularly advantageous in that, as compared with the use of the ball spline discussed in connection with the previous embodiment, not only can the number of component parts used be reduced, but also the torque responsive rotation control device can be assembled compact in size. Also, a discharge port of an orifice 9A of a one-way damper 43b defined by a housing 13A, a spring holder 12A and a spline hub 21 is, as shown in FIG. 6B, communicated with a gap of the involute spline so that a slide resistance in the spline can be reduced in the presence of a lubricant oil. Other structural features of the torque responsive rotation control device according to the second embodiment of the present invention are substantially identical with those shown in FIG. 1 in connection with the first embodiment of the present invention and, therefore, the details thereof are not reiterated for the sake of brevity.

Figure 7:
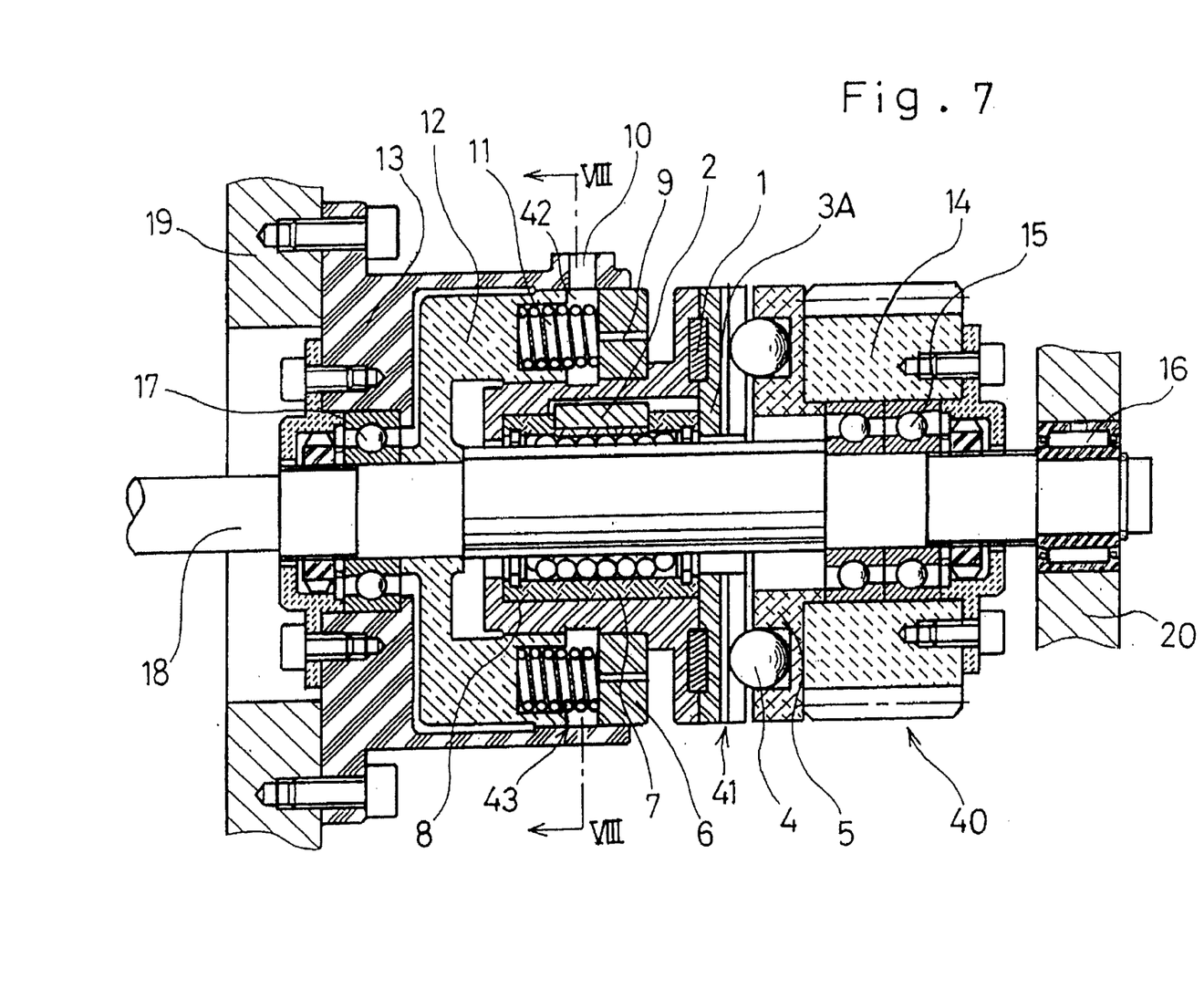
FIG. 7 is a longitudinal sectional view of the torque responsive rotation control device according to a third preferred embodiment of the present invention.
Figure 8:
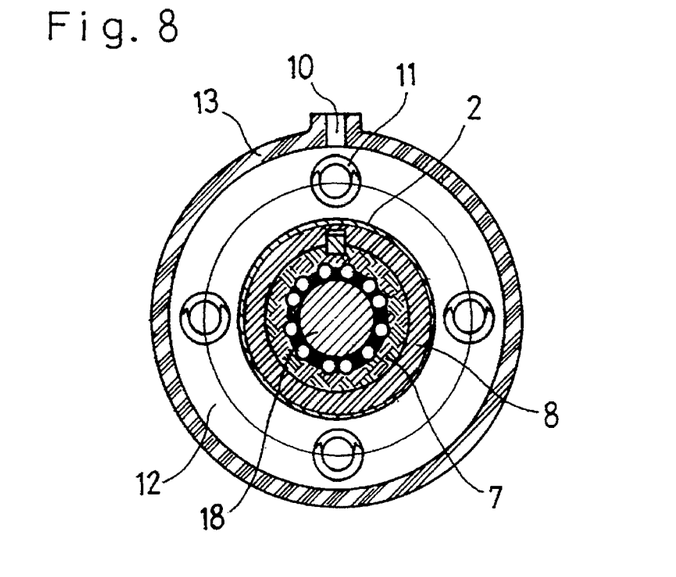
FIG. 8 is a cross-sectional view taken along the line VII—VII in FIG. 7.
Figure 9A:
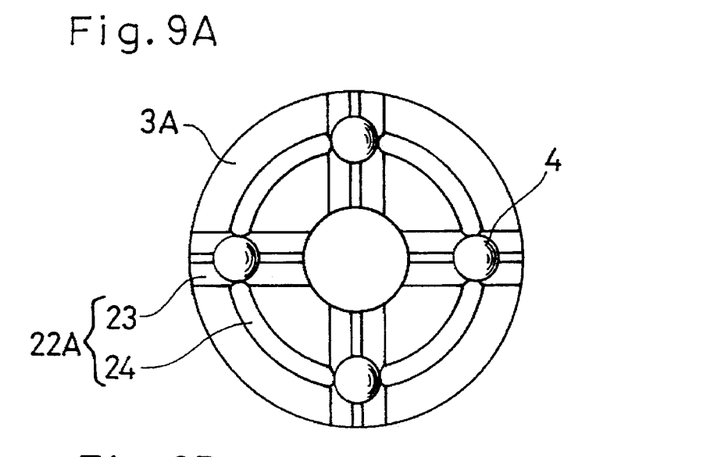
FIG. 9A is a front elevational view of a torque cam in a stationary condition employed in the torque responsive rotation control device shown in FIG. 8.
Figure 9B:
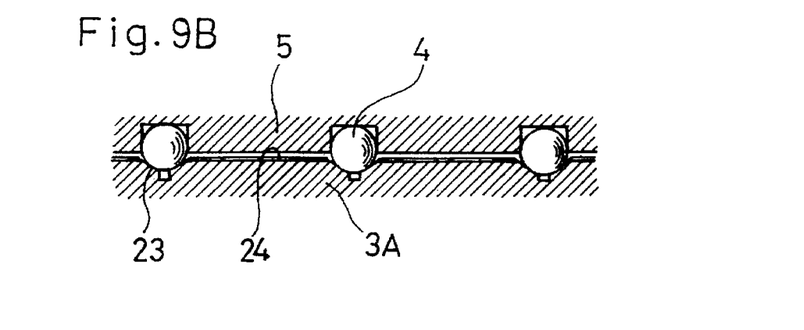
FIG. 9B is a sectional view of the torque cam in the stationary condition, taken along the pitch circle of balls employed therein.
Figure 10A:
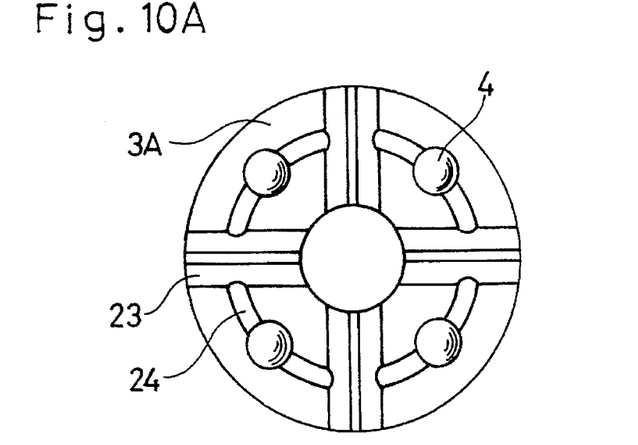
FIG. 10A is a front elevational view of the torque cam in a condition riding over a cam face.
Figure 10B:
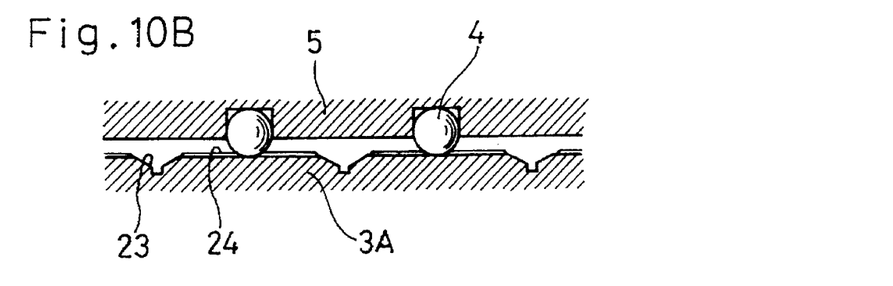
FIG. 10B is a sectional view of the torque cam in the condition riding over the cam face, taken along the pitch circle of the balls employed therein.
Figure 11A:
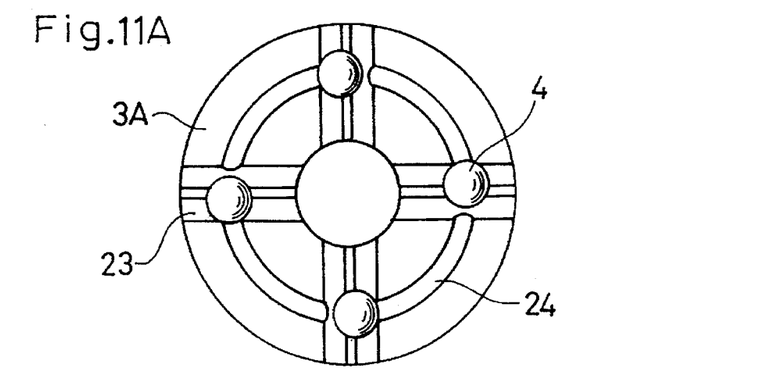
FIG. 11A is a front elevational view of the torque cam during torque transmission.
Figure 11B:
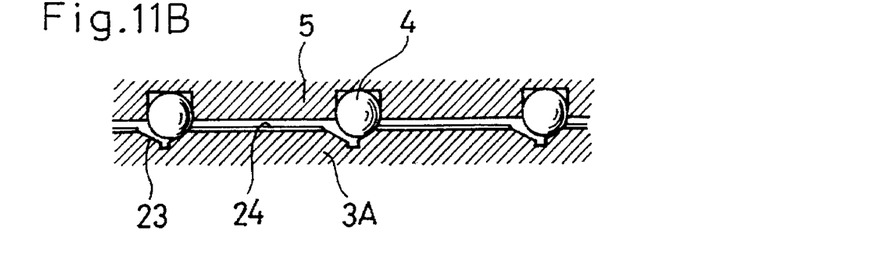
FIG. 11B is a sectional view of the torque cam during the torque transmission, taken along the pitch circle of the balls employed therein.

The torque responsive rotation control device according to a third preferred embodiment of the present invention is shown in FIGS. 7 to 11. Of these figures, FIG. 7 is a longitudinal sectional representation and FIG. 8 is a cross-sectional representation taken along the line VIII—VIII in FIG. 7. In this third embodiment, a cam face 22A defined in a torque cam 3A so as to have a depth varying cyclically in a direction circumferentially thereof and defining the raceway along which the balls 4 roll is, as shown in FIGS. 9 to 11, constituted by radial engagement grooves 23 of a generally V-shaped sectional shape along a circumferential direction and a ball guide groove 24 formed so as to follow the pitch circle of the balls 4 and communicating the neighboring engagement grooves 23 together. With this design, the cam face 22A can easily be formed and, also, by adjusting the difference in depth between the engagement grooves 23 and the ball guide grooves 24, the value of torque to which the torque limiter 41 can respond can easily be defined.

It is to be noted that FIG. 9A is a front elevational view of the torque cam 3A in a stationary condition in which the balls 4 are seated in V-shaped bottoms of the respective engagement grooves 23 defined so as to be spaced equidistantly. Also, the sectional shape of the ball guide grooves 24 along a radial direction thereof represents a semi-circular shape having a radius of curvature substantially equal to the radius of each ball 4 to render it to conform to the shape of the respective ball 4. By this design, the contact pressure between the balls 4 and the ball guide grooves 24 is advantageously reduced to prevent the torque cam 3A from being damaged.

FIG. 9B illustrates a fragmentary sectional representation of the torque cam 3A taken circumferentially along the pitch circle of the balls 4 to show the relationship in position between the balls 4 and the V-sectioned engagement grooves 23. Similarly, FIGS. 10A and 10B illustrate a condition in which the balls 4 having ridden over cam faces of the V-sectioned engagement grooves 23 as a result of the transmitted torque exceeding a predetermined value are seated within the respective guide grooves 24 with the input gear 14 rotating relative to the output shaft 18. FIGS. 11A and 11B illustrate a condition in which the balls 4 are halted midway the cam faces of the V-sectioned engagement grooves 23 as a result of the transmitted torque being within the predetermined value, thereby transmitting the torque to the output shaft 18. In this way, with the balls 4 intermittently engaged in the engagement grooves 23, the rotation can be intermittently transmitted to thereby avoid an increase of the transmitted torque, that is, the rotational speed.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention.

Accordingly, such changes and modifications are, unless they depart from the scope of the present invention as delivered from the claims annexed hereto, to be construed as included therein.

What is claimed is:

1. A torque responsive rotation control device which comprises a torque limiting mechanism interposed between an input rotary member and an output shaft coaxial with said input rotary member, said torque limiting mechanism including:

a torque cam mounted for non-rotation and axial movement relative to the output shaft and detachably engageable with the input rotary member in a direction of rotation thereof and a spring means for biasing the torque cam in a direction required for the torque cam to engage the input rotary member, wherein said torque limiting mechanism also includes a plurality of balls arranged in a circumferential direction for engaging the torque cam with the input rotary member and wherein said torque cam has a cam face serving as raceway along which the balls roll, said cam face representing a circumferentially extending groove having a depth varying cyclically in the circumferential direction.

2. The torque responsive rotation control device as claimed in claim 1, further comprising a one-way damper including an oil chamber for imposing an oil pressure on the torque cam in an axial direction so as to increase a force of engagement of the torque cam with the input rotary member and a throttle defined in a discharge passage of the oil chamber.

3. The torque responsive rotation control device as claimed in claim 1, wherein the input rotary member has pockets defined therein for receiving the respective balls.

4. The torque responsive rotation control device as claimed in claim 1, wherein said cam face of the torque cam has a depth varying substantially sinusoidally in the circumferential direction.

5. The torque responsive rotation control device as claimed in claim 1, wherein at least a portion of the cam face of the torque cam represents a sectional shape, as taken along a radial direction thereof, which conforms to the shape of the balls.

6. The torque responsive rotation control device as claimed in claim 1, wherein said cam face of the torque cam is formed by a plurality of radial engagement grooves arranged in the circumferential direction and guide grooves of a depth smaller than that of the engagement groove, each of said guide grooves extending circumferentially and communicating the neighboring engagement grooves together.

7. The torque responsive rotation control device as claimed in claim 2, wherein said torque cam is mounted through an involute spline and wherein said throttle has a discharge port opening towards a slide face of the involute spline.

8. The torque responsive rotation control device as claimed in claim 1, wherein said input rotary member is coupled with a crankshaft of an engine and said output shaft is coupled with an engine auxiliary equipment.

9. The torque responsive rotation control device as claimed in claim 8, wherein said engine auxiliary equipment is an oil pump for recirculating a lubricant oil for the engine.

* * * * *